(12) United States Patent
Chung et al.

(10) Patent No.: US 7,848,650 B2
(45) Date of Patent: Dec. 7, 2010

(54) DEVICE AND METHOD OF SWAPPING OPTICAL LABELS AND REPRODUCING OPTICAL PAYLOAD AND OPTICAL SWITCHING DEVICE USING THE DEVICE

(75) Inventors: Hwan Seok Chung, Daejeon (KR); Kwangjoon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 651 days.

(21) Appl. No.: 11/975,766

(22) Filed: Oct. 22, 2007

(65) Prior Publication Data
US 2008/0138081 A1 Jun. 12, 2008

(30) Foreign Application Priority Data
Dec. 8, 2006 (KR) .................. 10-2006-0125023

(51) Int. Cl.
*H04J 14/08* (2006.01)
(52) U.S. Cl. .................................... 398/52; 398/101
(58) Field of Classification Search .......... 398/52–54, 398/98–101
See application file for complete search history.

(56) References Cited
U.S. PATENT DOCUMENTS

2002/0131114 A1  9/2002  Yoo
2006/0051092 A1*  3/2006  Way ........................ 398/79
2006/0171393 A1  8/2006  Lin et al.

FOREIGN PATENT DOCUMENTS
KR  1020040037799  5/2004
(Continued)

OTHER PUBLICATIONS

Hung, W., et al., "A Bit-Serial Optical Packet Label-Swapping Scheme Using DPSK Encoded Labels," IEEE Photonics Technology Letters, vol. 15, No. 11 (Nov. 2003) pp. 1630-1632.

(Continued)

*Primary Examiner*—Leslie Pascal
(74) *Attorney, Agent, or Firm*—Blakely, Sokoloff, Taylor & Zafman (57) ABSTRACT

In a conventional network for transmitting an optical burst signal, it is impossible to effectively swap labels, reproduce a payload signal, and switch and transmit the signals. A device for swapping optical labels and reproducing an optical payload, includes: an envelope detection unit outputting an envelope of payloads or labels of an optical burst signal by converting phases of two signals obtained by converting the optical burst signal into an electrical signal; a payload processing unit extracting a payload signal, which is included in the optical burst signal, by synchronizing the optical burst signal with the envelope output from the envelope detection unit and optically reproducing or wavelength-converting the extracted payload signal; and a label processing unit extracting a label signal, which is included in the optical burst signal, by synchronizing the optical burst signal with the envelope output form the envelope detection unit and converting the extracted label signal according to a path along which the optical burst signal is transmitted. Accordingly, it is possible to effectively swap the labels, reproduce the payload signal, and switch and transmit the signals, in the network for transmitting the optical burst signal.

15 Claims, 6 Drawing Sheets

FOREIGN PATENT DOCUMENTS

| | | |
|---|---|---|
| KR | 2006-0039536 A | 5/2006 |
| KR | 2006-0087242 A | 8/2006 |

OTHER PUBLICATIONS

Lee, H.J., et al., "A Simple All-Optical Label Detection and Swapping Technique Incorporating a Fiber Bragg Grating Filter," IEEE Photonics Technology Letters, vol. 13, No. 6 (Jun. 2001) pp. 635-637.

Ramos, F., et al., "IST-LASAGNE: Towards All-Optical Label Swapping Employing Optical Logic Gates and Optical Flip-Flops," Journal of Lightwave Technology, vol. 23, No. 10 (Oct. 2005) pp. 2993-3011.

\* cited by examiner

DEVICE AND METHOD OF SWAPPING OPTICAL LABELS AND REPRODUCING OPTICAL PAYLOAD AND OPTICAL SWITCHING DEVICE USING THE DEVICE

CROSS-REFERENCE TO RELATED PATENT APPLICATION

This application claims the benefit of Korean Patent Application No. 10-2006-0125023, filed on Dec. 8, 2006, in the Korean Intellectual Property Office, the disclosure of which is incorporated herein in its entirety by reference.

BACKGROUND OF THE INVENTION

1. Field of the Invention

The present invention relates to a device and method of swapping optical labels and reproducing an optical payload, and an optical switching device using the device, and more particularly, to an optical label swapper and payload reproducer for switching optical burst signals in a network that employs an optical burst switch, and an optical burst switching device using the same.

This work was supported by the IT R&D program of MIC/IITA [2006-S-059-01, ASON based Metro Photonic Cross-Connect Technology]

2. Description of the Related Art

An existing optical transmission system employs an electrical switch when a switching operation is performed with respect to optical signals. However, an optical-electrical-optical (O/E/O) type network node, at which all the information at each node is opto-electrically converted and electrically processed, operates as a bottleneck of electrical processing of the information. In addition, the costs for electrically processing the information increase proportionally to an increase in the transmission capacity.

However, when express traffic is not converted into an electrical signal and passed as an optical signal type, and only add/drop is electro-optically converted and opto-electrically converted, at the node, the costs for the system are reduced, and the structure can be simplified.

In order to solve the problem, an optical burst switching system in which a transmitted optical signal is not converted into an electrical signal but directly processed as the optical signal is used.

Figure 1:
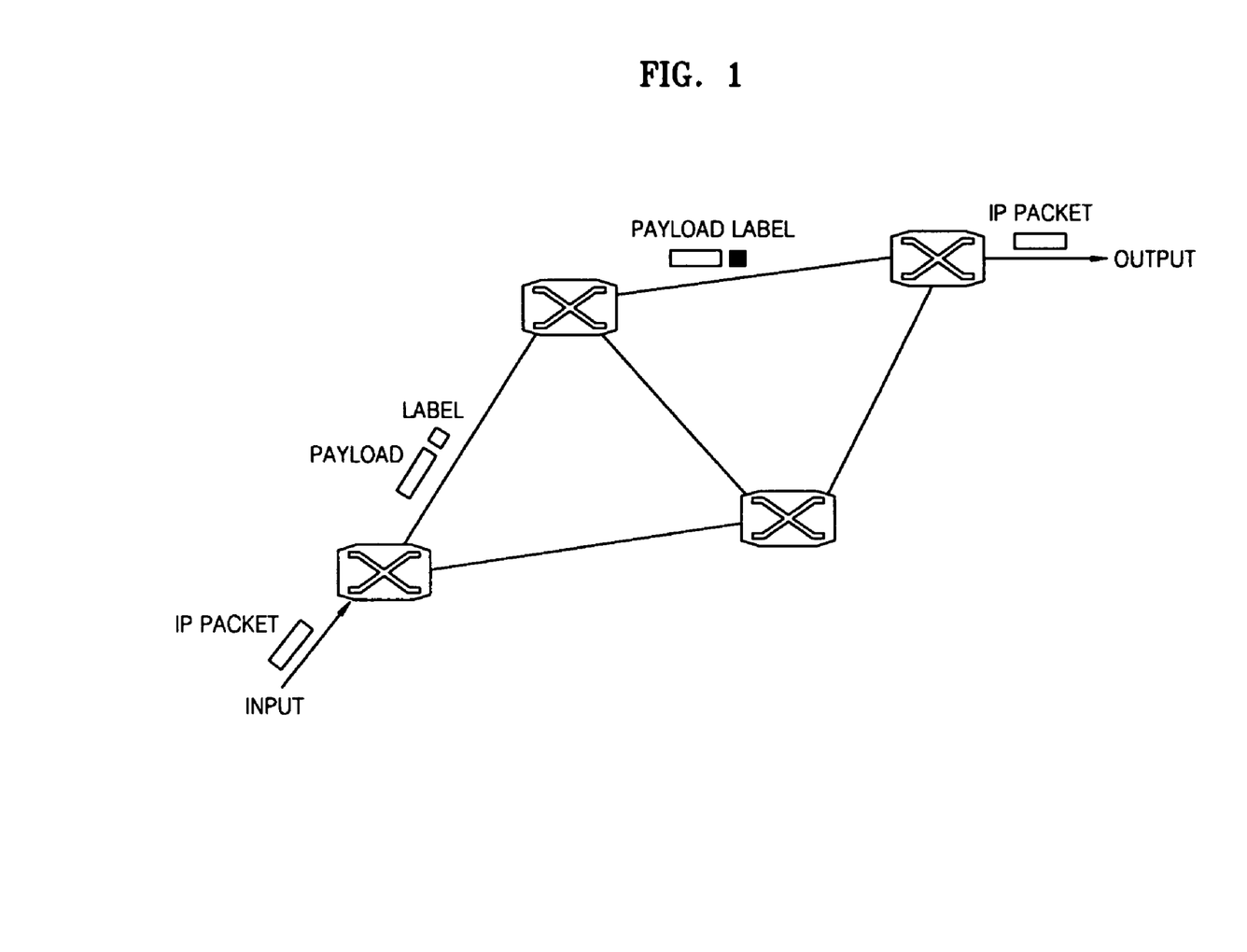
FIG. 1 illustrates a structure of an existing optical burst switching network.

FIG. 1 illustrates a structure of an existing optical burst switching network. A network that employs an optical burst switching technique as shown in FIG. 1 includes a departure node which is disposed at a network edge, a destination node in which a receiving unit is disposed, and a relay node through which an optical burst signal passes between departure and destination.

In the optical burst switching system, packet signals such as an input IP and the like are gathered at a network edge. A burst signal having a length greater than a predetermined length is generated and included in payloads. On the other hand, information on a moving direction of the payloads is included in the label. The optical burst signal includes the payloads and the labels.

The optical label is generated at the departure node and transmitted to the relay node. At the relay node, path information of the payload signals is recognized, and the payloads are switched by opto-electrically converting only label signals. In the switched payload signal, label information is updated and transmitted to the next node. This function is referred to as a label swapping function.

While the payload signals proceed along the transmission path, the quality of the signals may deteriorate. Thus, optical reproduction operation is performed. In order to prevent collision between wavelengths, wavelength-conversion may be performed, and availability of network resources increases.

A method that employs a time division multiplexing technique, a method that employs a code division multiplexing technique, and a method that employs a frequency division multiplexing technique (sub carrier wave) have been used as a method of transmitting labels. In the code division multiplexing technique, since a label swapping operation is performed by allocating different codes to the labels, a complicated encoder and decoder are needed.

In the frequency division multiplexing technique, that is, in a label swapping technique performed by allocating a separate sub carrier wave signal to the label, a separate frequency band is occupied, and therefore, frequency efficiency decreases. As the transmission speed increases, the frequency of the sub carrier wave increases, and thus is more influenced by a chromatic dispersion of an optical fiber.

On the contrary, in the time division multiplexing technique, since labels and payloads are transmitted by separating time regions of the labels and the payloads from each other, frequency efficiency is improved. There is an advantage in that the time division transmission technique which is a developed technology is used.

In the past, a technique that employs an all-optical label swapper as a relay node was known as a label swapping method based on a time division multiplexing technique. In this technique, an optical interferometer, which is constructed using a semiconductor optical amplifier, is used. A label swapping operation is performed by using a mutual phase modulation phenomenon generated in the semiconductor optical amplifier.

However, since a non-linear phenomenon in the semiconductor optical amplifier is used, the efficiency is low. The label swapping performance is seriously influenced by a polarization state, an optical power, a wavelength, and the type of an input light signal.

SUMMARY OF THE INVENTION

The present invention provides a unit capable of effectively swapping labels, reproducing a payload signal, and switching and transmitting the signals, in a network for transmitting an optical burst signal.

The present invention also provides a unit capable of simply recognizing a payload envelope signal and separating payloads and labels from an optical burst signal.

According to an aspect of the present invention, there is provided a device for swapping optical labels and reproducing an optical payload, the device comprising: an envelope detection unit outputting an envelope of payloads or labels of an optical burst signal by converting phases of two signals obtained by converting the optical burst signal into an electrical signal; a payload processing unit extracting a payload signal, which is included in the optical burst signal, by synchronizing the optical burst signal with the envelope output from the envelope detection unit and optically reproducing or wavelength-converting the extracted payload signal; and a label processing unit extracting a label signal, which is included in the optical burst signal, by synchronizing the optical burst signal with the envelope output from the envelope detection unit and converting the extracted label signal according to a path along which the optical burst signal is transmitted.

In the above aspect of the present invention, the envelope detection unit may comprise: an optical detection unit converting the optical burst signal into an electrical signal; a time delay unit splitting the electrical signal, which is converted by the optical detection unit, into two signals and converting the signals so that a phase difference is generated between the two signals; and a filter unit extracting the envelope of the payload or the label of the optical burst signal from a signal obtained by multiplying the two signals converted by the time delay unit.

In addition, the envelope detection unit may split the extracted envelope into two signals, maintains the waveform of one signal of the two signals, inverts the other signal, and transmits the signals to the payload processing unit or the label processing unit.

In addition, the payload processing unit may comprise: a first bias control unit determining whether the signal of the envelope is input on the basis of a DC bias predetermined by receiving the envelope output from the envelope detection unit; a first optical gate unit extracting the payload signal included in the optical burst signal by allowing the optical burst signal to pass when it is determined that the signal is input from the first bias control unit; and a first optical signal processing unit optically reproducing the extracted payload signal so as to maintain the signal quality or performing a wavelength-conversion operation so as to prevent an interference between signals from occurring according to a transmission path along which the optical burst signal is transmitted.

In addition, the label processing unit may comprise: a second bias control unit determining whether the signal of the envelope is input on the basis of a predetermined DC bias predetermined by receiving the envelope output from the envelope detection unit; a second optical gate unit extracting the label signal included in the optical burst signal by allowing the optical burst signal to pass when it is determined that the signal is input from the second bias control unit; and a second optical signal processing unit converting the extracted label signal according to the path along which the optical burst signal is transmitted.

In addition, the first or second optical gate unit may extract the payload signal by using an electro-absorption modulator or $LiNbO_3$ modulator.

In addition the device for swapping optical labels and reproducing an optical payload may further comprise a splitter which receives and splits the optical burst signal into signals in order to transmit the split signals to the envelope detection unit, the payload processing unit, and the label processing unit, respectively.

In addition the device for swapping optical labels and reproducing an optical payload may further comprise a combiner which combines the payload signal transmitted from the payload processing unit with the label signal transmitted from the label processing unit and generates a new optical burst signal.

According to another aspect of the present invention, there is provided an optical burst switching device that employs a device for swapping optical labels and reproducing an optical payload, the optical burst switching device comprising: a burst receiving unit including an envelope detection unit outputting an envelope of the payload or label of the optical burst signal by converting phases of two signals obtained by converting the optical burst signal into an electrical signal, a payload processing unit which optically reproduces or wavelength-converts an extracted payload signal by extracting the payload signal included in the optical burst signal by synchronizing the optical burst signal with the envelope output from the envelope detection unit, and a label processing unit which converts the extracted label signal according to the path along which the optical burst signal is transmitted by extracting the label signal included in the optical burst signal by synchronizing the optical burst signal with the envelope output from the envelope detection unit; a burst transmitting unit combining the payload signal which is optically reproduced or wavelength-converted by the payload processing unit with the label signal converted in the label processing unit, generating a new optical burst signal, and outputting the new optical burst signal; and an optical switch which is disposed between the burst receiving unit and the burst transmission unit so as to switch the payload signal, which is transmitted from the burst receiving unit, to the burst transmitting unit according to the label signal.

According to another aspect of the present invention, there is provided a method of swapping optical labels and reproducing an optical payload, the method comprising: (a) converting an optical burst signal into an electrical signal and outputting an envelope of a payload or label of the optical burst signal; (b) extracting an payload signal included in the optical burst signal by synchronizing the optical burst signal with the envelope output in (a) and optically reproducing or wavelength-converting the extracted payload signal; and (c) extracting a label signal included in the optical burst signal by synchronizing the optical burst signal with the envelope output in (a) and converting the extracted label signal according to a transmission path along which the optical burst signal is transmitted.

In the above aspect of the present invention, (a) may comprise: converting the optical burst signal into the electrical signal; splitting the converted electrical signal into two signals and converting the signals in order to generate a phase difference between the two signals; and extracting the envelope of the payload or the label of the optical burst signal from a signal obtained by multiplying the two signals.

In addition, (a) may further comprise splitting the extracted envelope into two signals, maintaining the waveform of one signal of the two signals, and inverting the other signal.

In addition, (b) may comprise: determining whether the signal of the envelope is input on the basis of a DC bias predetermined by receiving the envelope output in (a); extracting the payload signal included in the optical burst signal by allowing the optical burst signal to pass when it is determined that the signal is input; and optically reproducing the extracted payload signal so as to maintain the signal quality or performing a wavelength-conversion operation so as to prevent the collision between the signals from occurring according to a transmission path along which the optical burst signal is transmitted.

In addition, (c) may comprise: determining whether the signal of the envelope is input on the basis of a predetermined DC bias predetermined by receiving the envelope output in (a); extracting the label signal included in the optical burst signal by allowing the optical burst signal to pass when it is determined that the signal is input; and converting the extracted label signal according to the path along which the optical burst signal is transmitted.

In addition, (b) may further comprise combining the payload signal that is optically reproduced or wavelength-converted in (b) with the label signal that is converted in (c) and generating a new optical burst signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the attached drawings.

Figure 2:
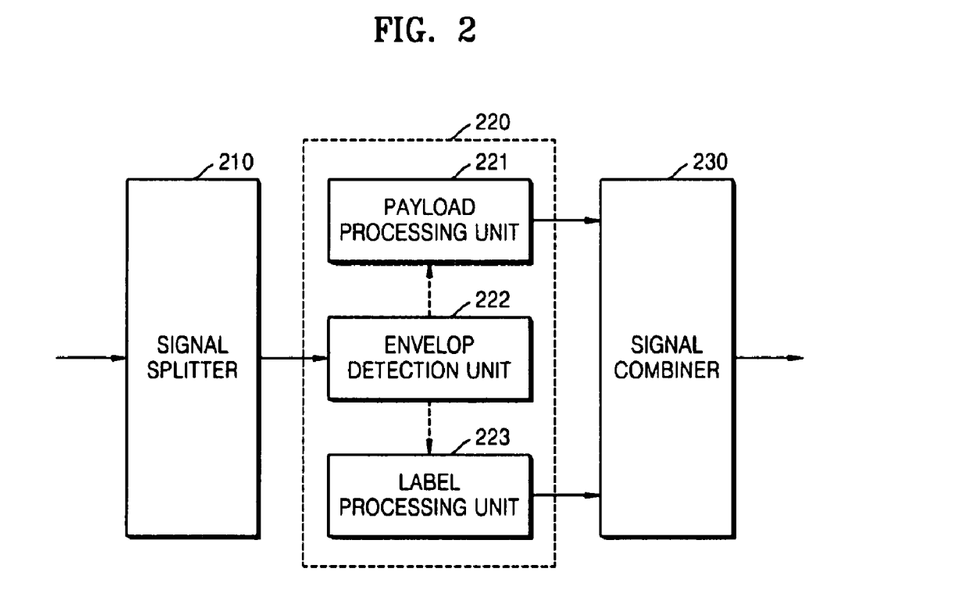
FIG. 2 is a schematic diagram illustrating a structure of a device for swapping optical labels and reproducing an optical payload according to an embodiment of the present invention.

FIG. 2 is a schematic diagram illustrating a structure of a device for swapping optical labels and reproducing an optical payload according to an embodiment of the present invention. Referring to FIG. 2, a device 220 for swapping optical labels and reproducing an optical payload includes a payload processing unit 221, an envelope detection unit 222, and a label processing unit 223.

The envelope detection unit 222 converts phases of two signals obtained by converting an optical burst signal into an electrical signal and outputs envelopes of the payloads or labels of the optical burst signal.

The payload processing unit 221 extracts the payload signal, which is included in the optical burst signal, by synchronizing the optical burst signal with the envelope output from the envelope detection unit and optically reproduces or wavelength-converts the extracted payload signal.

The label processing unit 223 extracts the label signal, which is included in the optical burst signal, by synchronizing the optical burst signal with the envelope output from the envelope detection unit. The label processing unit 223 converts the extracted label signal according to the path along which the optical burst signal is transmitted.

A signal splitter 210 receives and splits the optical burst signal in order to transmit the split optical burst signals to the envelope detection unit, the payload processing unit, and the label processing unit.

A signal combiner 230 generates a new optical burst signal by combining the payload signal transmitted from the payload processing unit with the label signal transmitted from the label processing unit.

Figure 3:
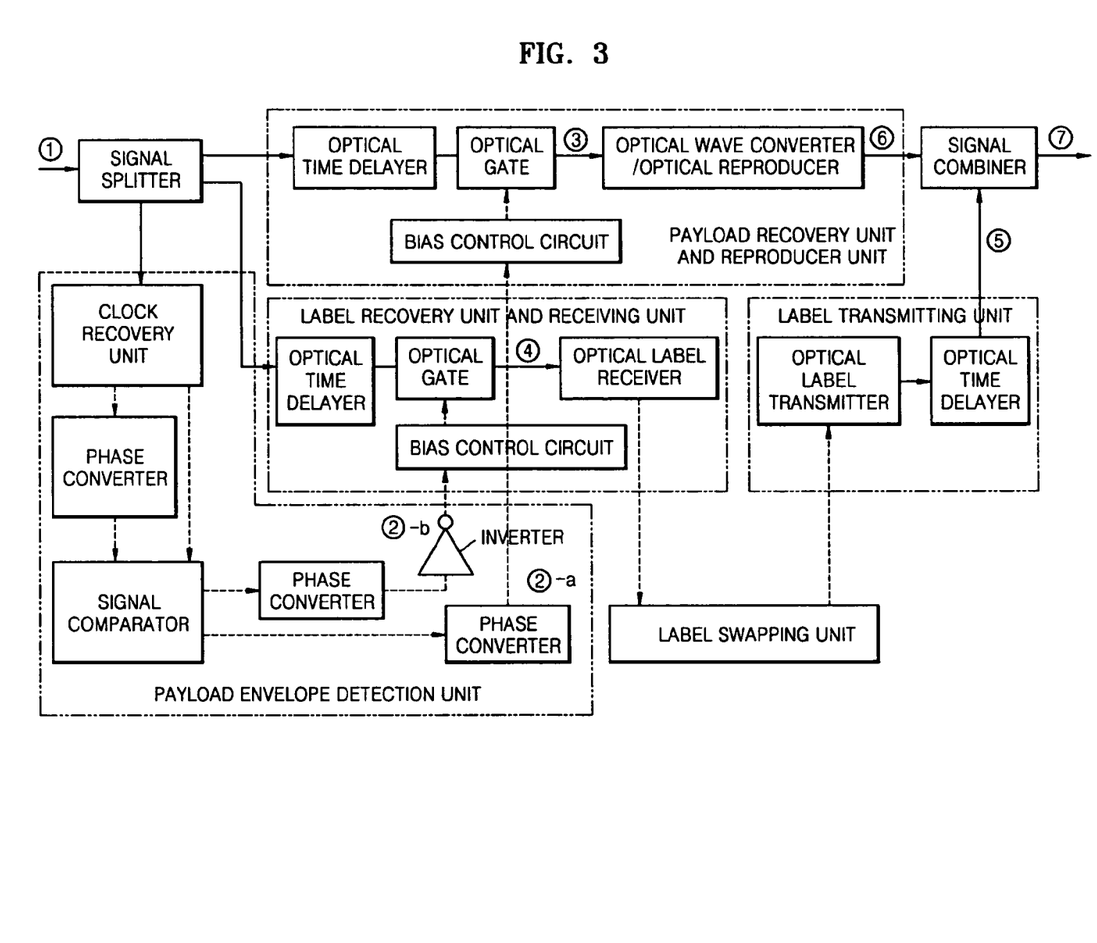
FIG. 3 is a detailed diagram illustrating structures of an optical label swapper and an optical payload reproducing device according to an embodiment of the present invention.

FIG. 3 is a detailed diagram illustrating structures of an optical label swapper and an optical payload reproducing device according to an embodiment of the present invention.

Figure 4:
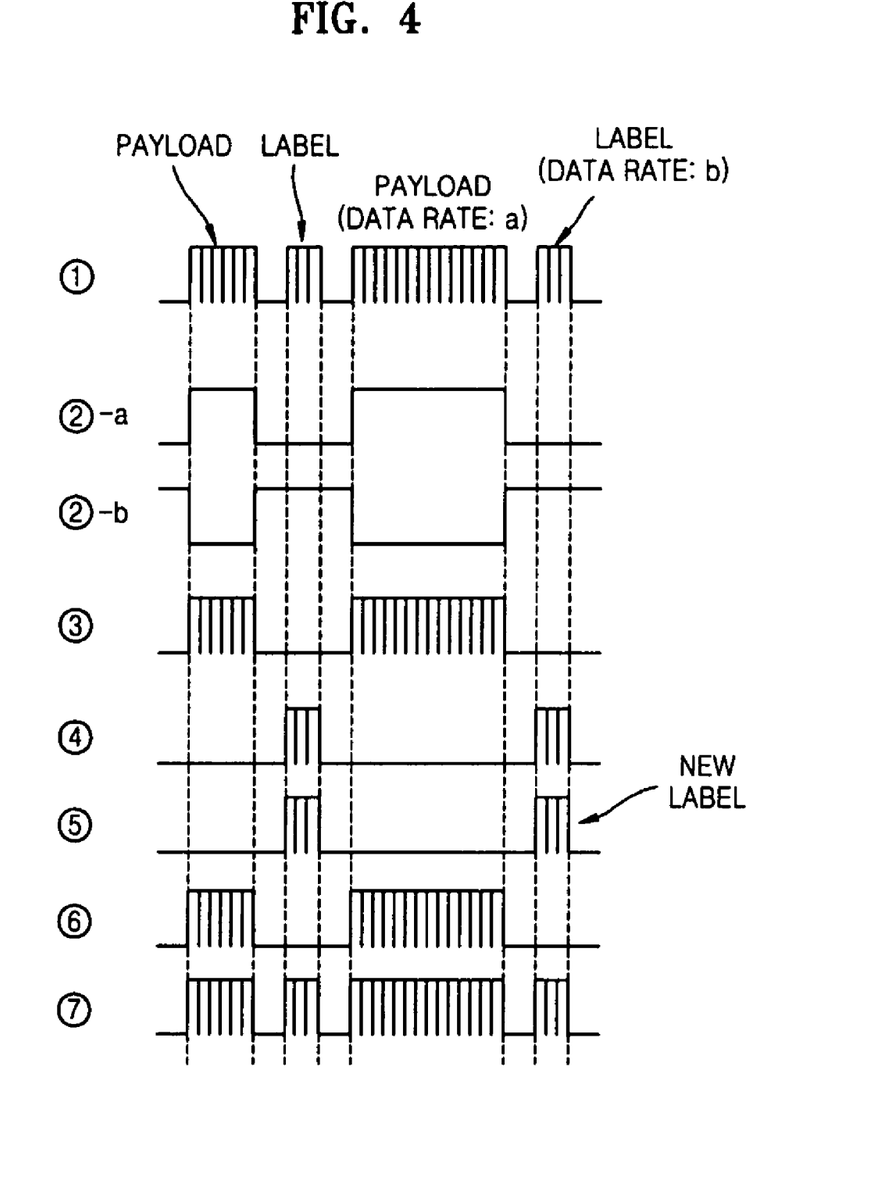
FIG. 4 illustrates waveforms at points shown in FIG. 3 according to an embodiment of the present invention.

FIG. 4 illustrates waveforms at points shown in FIG. 3 according to an embodiment of the present invention.

Figure 5:
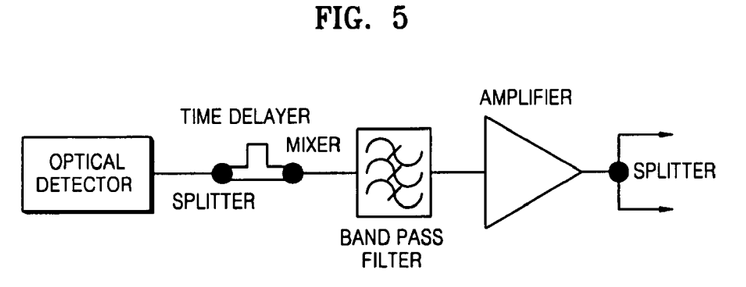
FIG. 5 illustrates a structure of a clock recovery unit shown in FIG. 3 according to an embodiment of the present invention.

FIG. 5 illustrates a structure of a clock recovery unit shown in FIG. 3 according to an embodiment of the present invention.

Figure 6:
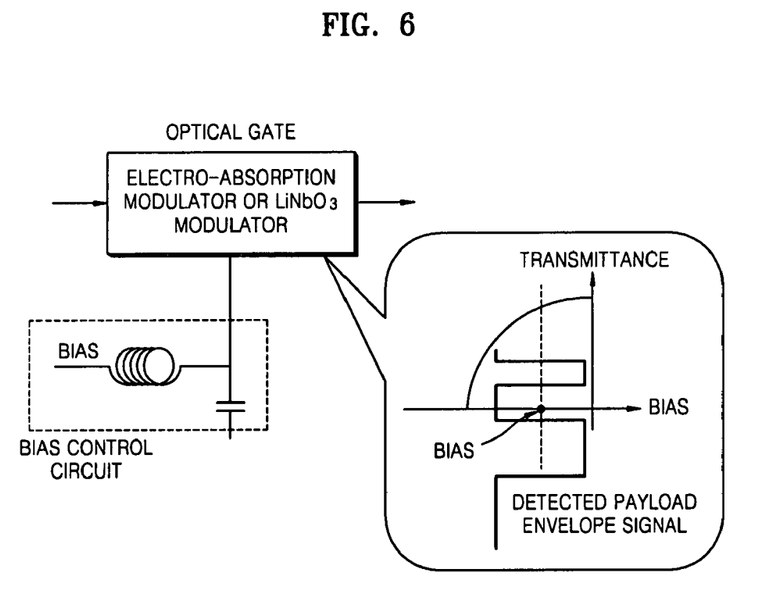
FIG. 6 illustrates a structure and a transmission characteristic of an optical gate shown in FIG. 3 according to an embodiment of the present invention.

FIG. 6 illustrates a structure and a transmission characteristic of an optical gate shown in FIG. 3 according to an embodiment of the present invention.

In FIGS. 3 to 6, detailed components of the device for swapping optical labels and reproducing an optical payload and changes in waveforms according to the progress of the waves are illustrated. Therefore, FIGS. 3 to 6 will be concurrently described.

In FIG. 3, solid lines indicate optical signals, and dotted lines indicate electrical signals. First, the optical burst signal having a waveform ① shown in FIG. 4 is input into a left side input shown in FIG. 3.

As shown in the waveform ①, the optical burst signal includes payloads and labels. Data that is to be transmitted is included in the payloads. Information on a moving direction is included in the labels.

The input signal is split into three paths and transmitted to the payload envelope detection unit, a payload recovery unit and a reproducing unit, and a label recovery unit and a receiving unit, respectively.

The signal input into the payload envelope detection unit is first transmitted to the clock recovery unit.

As shown in FIG. 5, the clock recovery unit includes an optical detector, a splitter, a mixer, a time delayer, a band pass filter, and an amplifier.

The input optical signal is converted into an electrical signal and split into two parts. The split signals are multiplied by time delays, and accordingly the magnitude of the clock component increases. At this time, only the clock component corresponding to the payload signal passes through the band pass filter and is amplified.

The amplified signal is split into two parts again. A split signal is input into a signal comparator, and the other split signal is input into the signal comparator through a phase converter. The signal comparator may be constructed by using a mixer or the like. When the payloads are input, clocks are recovered, and a specific signal component is output. When the labels are input, or when no signal is input, there is no output of the signal comparator. The waveform is waveform ②-a shown in FIG. 4.

That is, the signal comparator is synchronized with the payload signal. The signal comparator outputs only the envelope of the payload signal. The extracted payload envelope signal is split into two parts and transmitted to the payload recovery unit and a reproducing unit, and a label recovery unit and a receiving unit, respectively.

In the payload recovery unit and the reproducing unit, the payload envelope signal extracted by the bias control circuit is input into the optical gate. The optical burst signal connected from the signal splitter is transmitted to the input side of the optical gate and synchronized with the payload envelope signal extracted by using the optical time delayer.

The optical gate may be constructed by using an electro-absorption modulator or LiNbO$_3$ modulator as shown in FIG. 6. Transmission characteristics of the two modulators are also shown.

When a DC bias is applied to a predetermined part, and the extracted payload envelope signal is present, most of the input optical signal is output. When there is no envelope signal, the input optical signal is blocked and not output.

Therefore, only the payload parts of the optical burst signal are extracted as shown in waveform ③ illustrated in FIG. 4. While the signal is being transmitted along a transmission path, the quality of the signal may deteriorate. Thus, when the optical reproduction operation is performed, and the signal is transmitted to the next node, in a case where wavelengths collides with each other, the wavelength-conversion is additionally performed (waveform ⑥ illustrated in FIG. 4).

In the label recovery unit and the receiving unit, only the label parts are extracted from the optical burst signal as shown in waveform ④ illustrated in FIG. 4 by performing the same procedures as the payload recovery unit and the reproduction unit by inverting (waveform ②-$b$ illustrated in FIG. 4) the detected payload envelope and inputting the inverted payload envelope into the optical gate. The label parts are transmitted to the label processing unit by the optical label receiver.

In the label processing unit, the path information of the optical burst signal is recognized and updated. The updated path information is transmitted to the label transmitter and converted into the optical signal. The waveform of the optical signal is waveform ⑤ illustrated in FIG. 4.

The reproduced or wavelength-converted payload and the updated label signal are output in synchronization with each other. The waveform is waveform ⑦ illustrated in FIG. 4.

In the above example, the payloads and labels are separated from the optical burst signal by detecting the payload envelope. Alternatively, the payloads and labels may be separated by detecting the envelope of the labels, transmitting the envelope to the label recovery unit and the receiving unit and transmitting the envelope to the payload recovery unit and the reproducing unit by using an inverter.

In this case, only the clock components corresponding to the transmission speed of the labels pass through the band pass filter.

Figure 7:
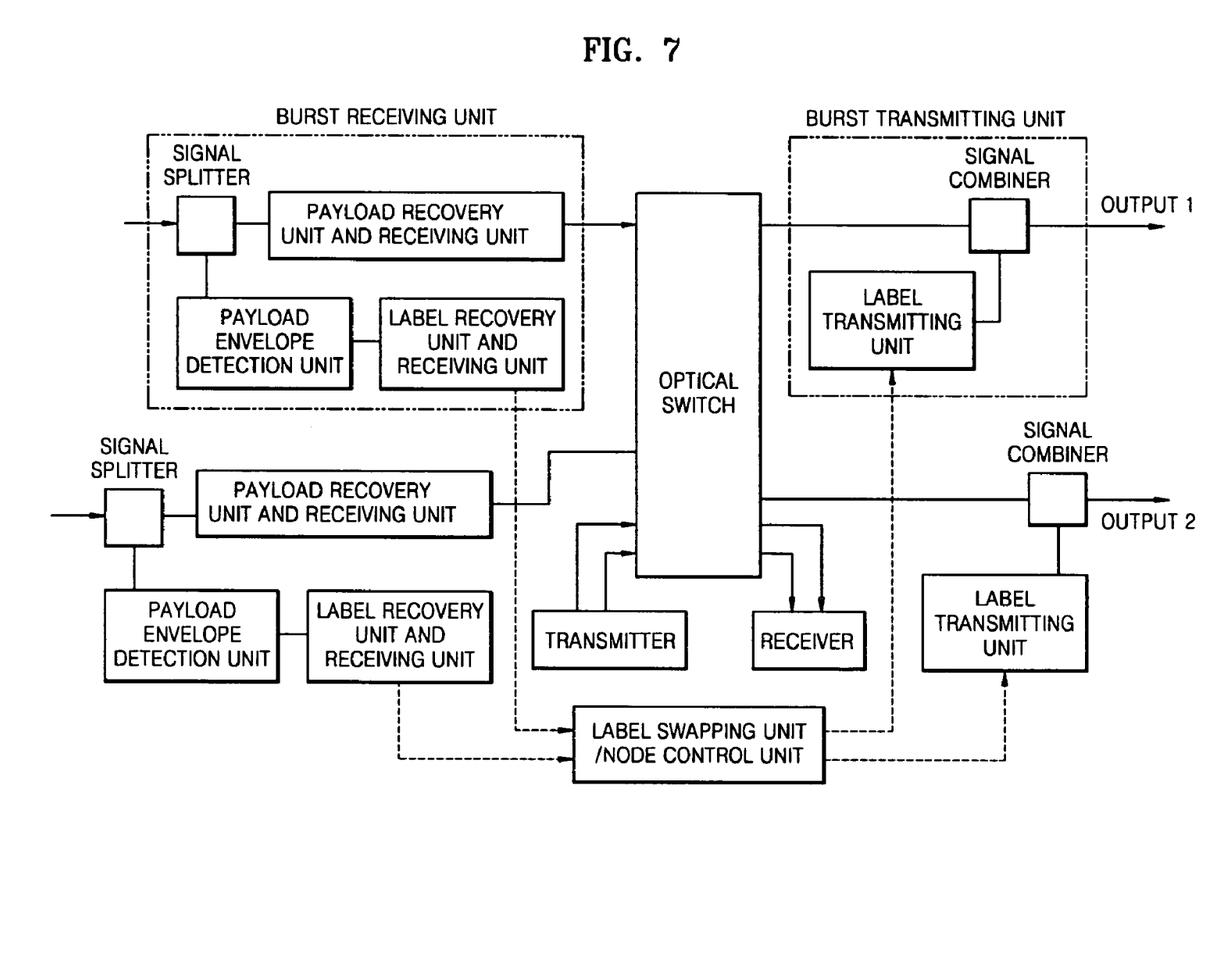
FIG. 7 illustrates a structure of an optical switching device that employs an optical label swapper and an optical payload reproducing device according to an embodiment of the present invention.

FIG. 7 illustrates a structure of an optical switching device that employs an optical label swapper and an optical payload reproducing device according to an embodiment of the present invention. Referring to FIG. 7, the optical burst switching node includes a plurality of input ports, a plurality of optical burst receiving units, a plurality of optical burst transmission units, a label processing unit, a node control unit, an optical switch, a payload transmitter, a payload receiver, and a plurality of output ports.

The burst receiving unit includes an envelope detection unit outputting the envelope of the payload or label of the optical burst signal by converting the phases of the two signals obtained by converting the optical burst signal into the electrical signal, a payload processing unit which optically reproduces the extracted payload signal or converts the wavelength of the extracted payload signal by extracting the payload signal included in the optical burst signal by synchronizing the optical burst signal with the envelope output from the envelope detection unit, and a label processing unit which converts the extracted label signal according to the path along which the optical burst signal is transmitted by extracting the label signal in the optical burst signal by synchronizing the optical burst signal with the envelope output from the envelope detection unit.

The burst transmitter combines the payload signal which is optically reproduced or wavelength-converted by the payload processing unit with the label signal converted by the label processing unit, generates a new optical burst signal, and outputs the new optical burst signal.

The optical switch is disposed between the burst receiving unit and the burst transmission unit. The optical switch switches the payload signal, which is transmitted from the burst receiving unit, to the burst transmitting unit according to the label signal.

For example, the optical burst signal received from an input 1 port may be switched to an output 1 or output 2. When the received node is the final destination, the signal is transmitted to the label receiver and recovered as the original signal.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A device for swapping optical labels and reproducing an optical payload, the device comprising:
    an envelope detection unit outputting an envelope of payloads or labels of an optical burst signal by converting phases of two signals obtained by converting the optical burst signal into an electrical signal;
    a payload processing unit extracting a payload signal, which is included in the optical burst signal, by synchronizing the optical burst signal with the envelope output from the envelope detection unit and optically reproducing or wavelength-converting the extracted payload signal; and
    a label processing unit extracting a label signal, which is included in the optical burst signal, by synchronizing the optical burst signal with the envelope output from the envelope detection unit and converting the extracted label signal according to a path along which the optical burst signal is transmitted.

2. The device of claim 1, wherein the envelope detection unit comprises:
    an optical detection unit converting the optical burst signal into an electrical signal;
    a time delay unit splitting the electrical signal, which is converted by the optical detection unit, into two signals and converting the signals so that a phase difference is generated between the two signals; and
    a filter unit extracting the envelope of the payload or the label of the optical burst signal from a signal obtained by multiplying the two signals converted by the time delay unit.

3. The device of claim 2, wherein the envelope detection unit splits the extracted envelope into two signals, maintains the waveform of one signal of the two signals, inverts the other signal, and transmits the signals to the payload processing unit or the label processing unit.

4. The device of claim 1, wherein the payload processing unit comprises:
    a first bias control unit determining whether the signal of the envelope is input on the basis of a predetermined DC bias by receiving the envelope output from the envelope detection unit;

a first optical gate unit extracting the payload signal included in the optical burst signal by allowing the optical burst signal to pass when it is determined that the signal is input from the first bias control unit; and a first optical signal processing unit optically reproducing the extracted payload signal so as to maintain the signal quality or performing a wavelength-conversion operation so as to prevent an interference between signals from occurring according to a transmission path along which the optical burst signal is transmitted.

5. The device of claim 1, wherein the label processing unit comprises:

a second bias control unit determining whether the signal of the envelope is input on the basis of a predetermined DC bias by receiving the envelope output from the envelope detection unit;

a second optical gate unit extracting the label signal included in the optical burst signal by allowing the optical burst signal to pass when it is determined that the signal is input from the second bias control unit; and a second optical signal processing unit converting the extracted label signal according to the path along which the optical burst signal is transmitted.

6. The device of claim 4 or 5, wherein the first or second optical gate unit extracts the payload signal by using an electro-absorption modulator or $LiNbO_3$ modulator.

7. The device of claim 1, further comprising a splitter which receives and splits the optical burst signal into signals in order to transmit the split signals to the envelope detection unit, the payload processing unit, and the label processing unit, respectively.

8. The device of claim 1, further comprising a combiner which combines the payload signal transmitted from the payload processing unit with the label signal transmitted from the label processing unit and generates a new optical burst signal.

9. An optical burst switching device that employs a device for swapping optical labels and reproducing an optical payload, the optical burst switching device comprising:

a burst receiving unit including an envelope detection unit outputting an envelope of the payload or label of the optical burst signal by converting phases of two signals obtained by converting the optical burst signal into an electrical signal, a payload processing unit which optically reproduces or wavelength-converts an extracted payload signal by extracting the payload signal included in the optical burst signal by synchronizing the optical burst signal with the envelope output from the envelope detection unit, and a label processing unit which converts the extracted label signal according to the path along which the optical burst signal is transmitted by extracting the label signal included in the optical burst signal by synchronizing the optical burst signal with the envelope output from the envelope detection unit;

a burst transmitting unit combining the payload signal which is optically reproduced or wavelength-converted by the payload processing unit with the label signal converted in the label processing unit, generating a new optical burst signal, and outputting the new optical burst signal; and an optical switch which is disposed between the burst receiving unit and the burst transmission unit so as to switch the payload signal, which is transmitted from the burst receiving unit, to the burst transmitting unit according to the label signal.

10. A method of swapping optical labels and reproducing an optical payload, the method comprising:

(a) converting an optical burst signal into an electrical signal and outputting an envelope of a payload or label of the optical burst signal;

(b) extracting a payload signal included in the optical burst signal by synchronizing the optical burst signal with the envelope output in (a) and optically reproducing or wavelength-converting the extracted payload signal; and (c) extracting a label signal included in the optical burst signal by synchronizing the optical burst signal with the envelope output in (a) and converting the extracted label signal according to a transmission path along which the optical burst signal is transmitted.

11. The method of claim 10, wherein (a) comprises:

converting the optical burst signal into the electrical signal;

splitting the converted electrical signal into two signals and converting the signals in order to generate a phase difference between the two signals; and extracting the envelope of the payload or the label of the optical burst signal from a signal obtained by multiplying the two signals.

12. The method of claim 11, wherein (a) further comprises splitting the extracted envelope into two signals, maintaining the waveform of one signal of the two signals, and inverting the other signal.

13. The method of claim 10, wherein (b) comprises:

determining whether the signal of the envelope is input on the basis of a DC bias predetermined by receiving the envelope output in (a);

extracting the payload signal included in the optical burst signal by allowing the optical burst signal to pass when it is determined that the signal is input; and optically reproducing the extracted payload signal so as to maintain the signal quality or performing a wavelength-conversion operation so as to prevent the collision between the signals from occurring according to a transmission path along which the optical burst signal is transmitted.

14. The method of claim 10, wherein (c) comprises:

determining whether the signal of the envelope is input on the basis of a predetermined DC bias predetermined by receiving the envelope output in (a);

extracting the label signal included in the optical burst signal by allowing the optical burst signal to pass when it is determined that the signal is input; and converting the extracted label signal according to the path along which the optical burst signal is transmitted.

15. The method of claim 10, wherein (b) further comprises combining the payload signal that is optically reproduced or wavelength-converted in (b) with the label signal that is converted in (c) and generating a new optical burst signal.

* * * * *